United States Patent [19]

Culpepper et al.

[11] Patent Number: 4,852,328
[45] Date of Patent: Aug. 1, 1989

[54] CONTAINER SEALING APPARATUS

[75] Inventors: Will L. Culpepper, Covington; James J. Feliks, Doraville, both of Ga.

[73] Assignee: The Mead Corporation, Dayton, Ohio

[21] Appl. No.: 262,425

[22] Filed: Oct. 25, 1988

[51] Int. Cl.⁴ .............................. B65B 7/28; B67B 3/06
[52] U.S. Cl. ........................................ 53/300; 53/306; 53/368
[58] Field of Search ................ 53/282, 299, 300, 302, 53/306, 329, 367, 368, 373, 307; 156/583.5; 198/802, 803.2, 803.14, 803.15

[56] References Cited

U.S. PATENT DOCUMENTS

| | | | |
|---|---|---|---|
| 3,186,142 | 6/1965 | Borgardt et al. | 53/373 |
| 3,817,816 | 6/1974 | Watt | 53/329 X |
| 4,056,922 | 11/1977 | Schilte | 53/300 X |
| 4,176,507 | 12/1979 | Mancini | 53/282 X |
| 4,674,935 | 6/1987 | Feliks et al. | 53/307 X |

Primary Examiner—Horace M. Culver
Attorney, Agent, or Firm—Rodgers & Rodgers

[57] ABSTRACT

A container lid positioned atop a filled container is sealed to the top of the container by a vertically reciprocable sealing device engageable with the container lid, the container and lid being positioned on yieldable structure so as to avoid damage to the sealing apparatus or to the container being sealed which might occur due to the thrust of the sealing device.

2 Claims, 3 Drawing Sheets

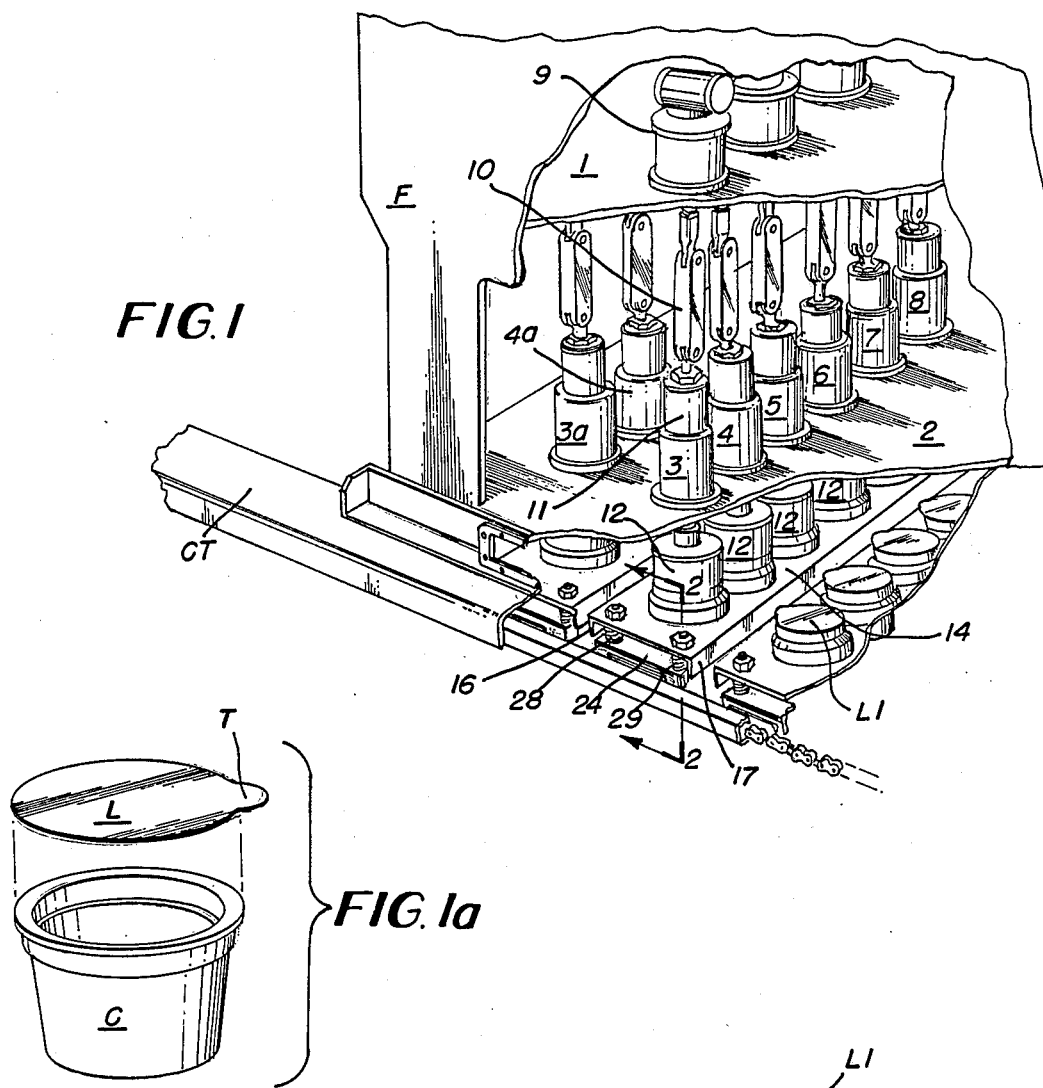
FIG.1
FIG.1a
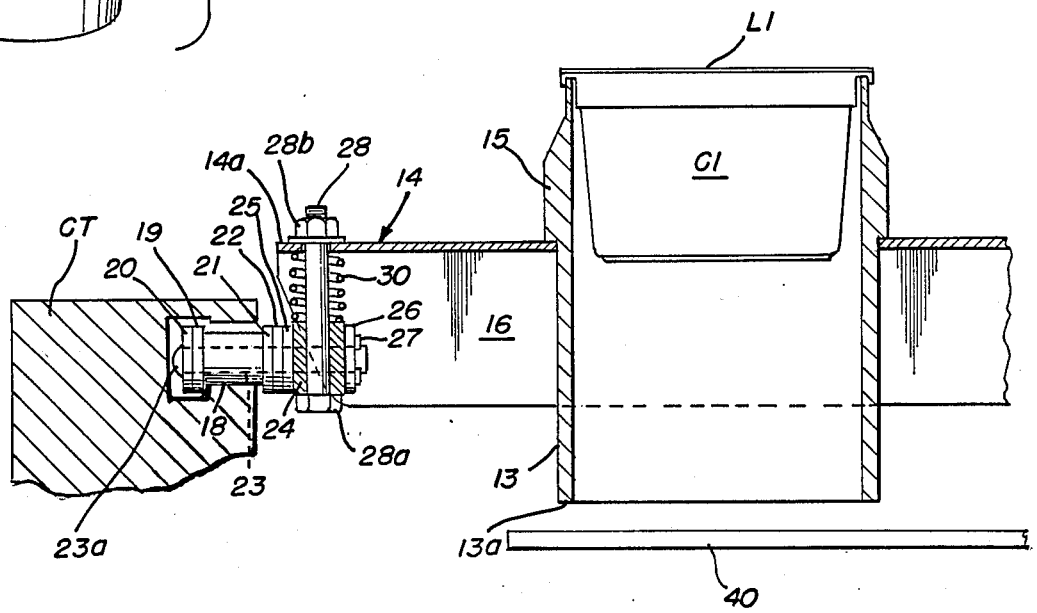
FIG.2

CONTAINER SEALING APPARATUS

TECHNICAL FIELD

This invention relates to packaging apparatus and is particularly concerned with the application of a sealing lid to a filled container.

BACKGROUND ART

U.S. Pat. Nos. 4,235,265 issued Nov. 25, 1980; 4,282,699 issued Aug. 11, 1981; 4,391,080 issued July 5, 1983 and 4,097,775 issued Oct. 18, 1983 concern filling and sealing apparatus for containers used in conjunction with aseptic packaging systems and are all owned by the assignee of this invention.

U.S. Pat. No. 4,674,935 issued June 23, 1987 and owned by the assignee of this invention discloses and covers a mechanism for feeding a container lid out of a hopper and onto a conveyor for subsequent application to a filled container and U.S. Pat. No. 4,705,159 issued November 10, 1987 and owned by the assignee of this invention discloses and covers apparatus for removing filled and sealed containers from a packaging machine.

SUMMARY

This invention is particularly applicable to sealing filled containers for which container lids are fed from a hopper according to U.S. Pat. No. 4,674,935. The containers which are sealed according to this invention are subsequently removed from the packaging machine according to U.S. Pat. No. 4,705,159.

According to this invention in one form a filled container and its associated lid are sealed by a reciprocable sealing head disposed above the container and lid and arranged to engage and seal the lid to the top edge of the container and vertically yieldable conveyor means for supporting the container and lid during a sealing operation is provided so as to avoid damage to the apparatus or to the container due to the force applied by the sealing head during a sealing operation.

BRIEF DESCRIPTION OF THE DRAWINGS

In the drawings

FIG. 1 is a perspective view of a plurality of container sealing mechanisms formed according to this invention;

FIG. 1a discloses a flanged container and a lid for application atop the container in sealed relation;

FIG. 2 is a cross sectional view which is much enlarged and which is taken along the line designated 2—2 in FIG. 1;

BEST MODE OF CARRYING OUT THE INVENTION

Figure 3:
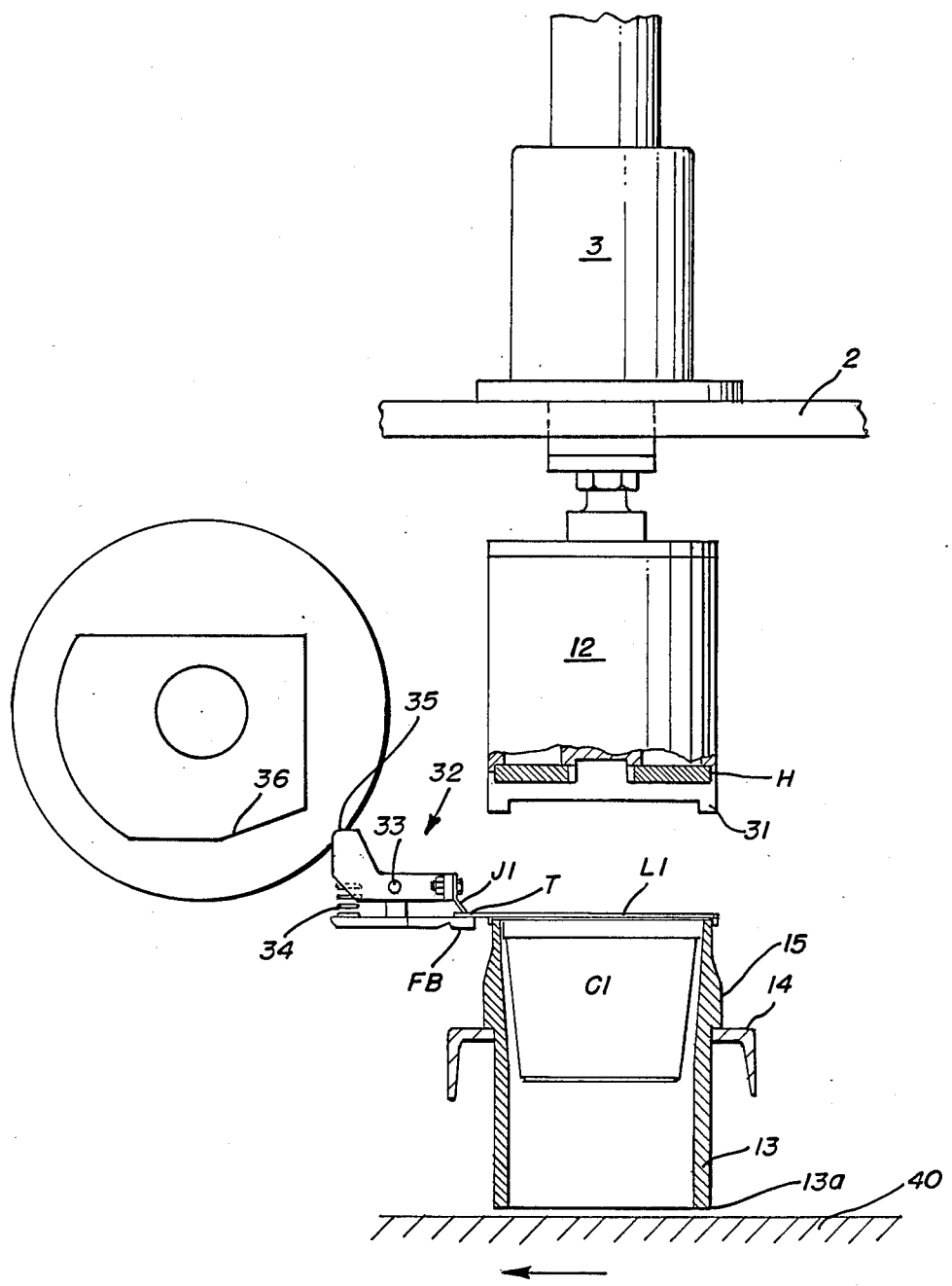
FIG. 3 is an enlarged side view partially in section of one sealing mechanism such as those shown generally in FIG. 1.

With reference to FIG. 1, the frame shown in fragmentary form is designated at "F". The numeral 1 designates a horizontal fixed support plate secured to frame 1 and the numeral 2 generally designates a second horizontal fixed support plate which is mounted on the frame "F". In practice a plurality of sealing heads are employed. In FIG. 1 sealing head bearings 3-8 inclusive are supported by support plate 2 and are schematically represented. In practice, a second row of sealing mechanisms are employed and the bearings for only two of which 3a and 4a are shown in FIG. 1 it being understood that a total of six sealing assemblies in each row are normally employed in practice.

FIG. 1a shows a flanged container C and a container lid L. A filled container C is sealed by placing a lid L atop the container and thereafter by heat sealing the lid to the container flange according to this invention.

Since all of the reciprocable sealing heads are identical only one such device is here shown and described in detail. With reference to FIG. 1, a pneumatic motor mounted on plate 1 and generally designated by the numeral 9 includes a piston rod which extends through an aperture in plate 1 and which is coupled with a push rod 10 which in turn is coupled through bearing structure 3 with a sealing head 12. Bearing structure 3 is mounted on horizonal fixed support plate 2 in coincidence with an aperture in plate 2.

A container such as C1 and which is shown in FIG. 2 is mounted on container supporting tube 13 which is mounted on intermittently movable container support means comprising support bar 14 due to insertion of the container C1 through an aperture formed in support bar 14. Flange 15 of container supporting tube 13 supports the tube 13 and the container C1. Tube 13 is fixedly mounted on support bar 14 by any suitable means such as by welding, screws or the like.

In practice support bar 14 is in the form of a channel having a horizontal base 14a and side flanges 16 only one of which appears in FIG. 2. Both flanges 16 and 17 are observable in FIG. 1.

Figure 4:
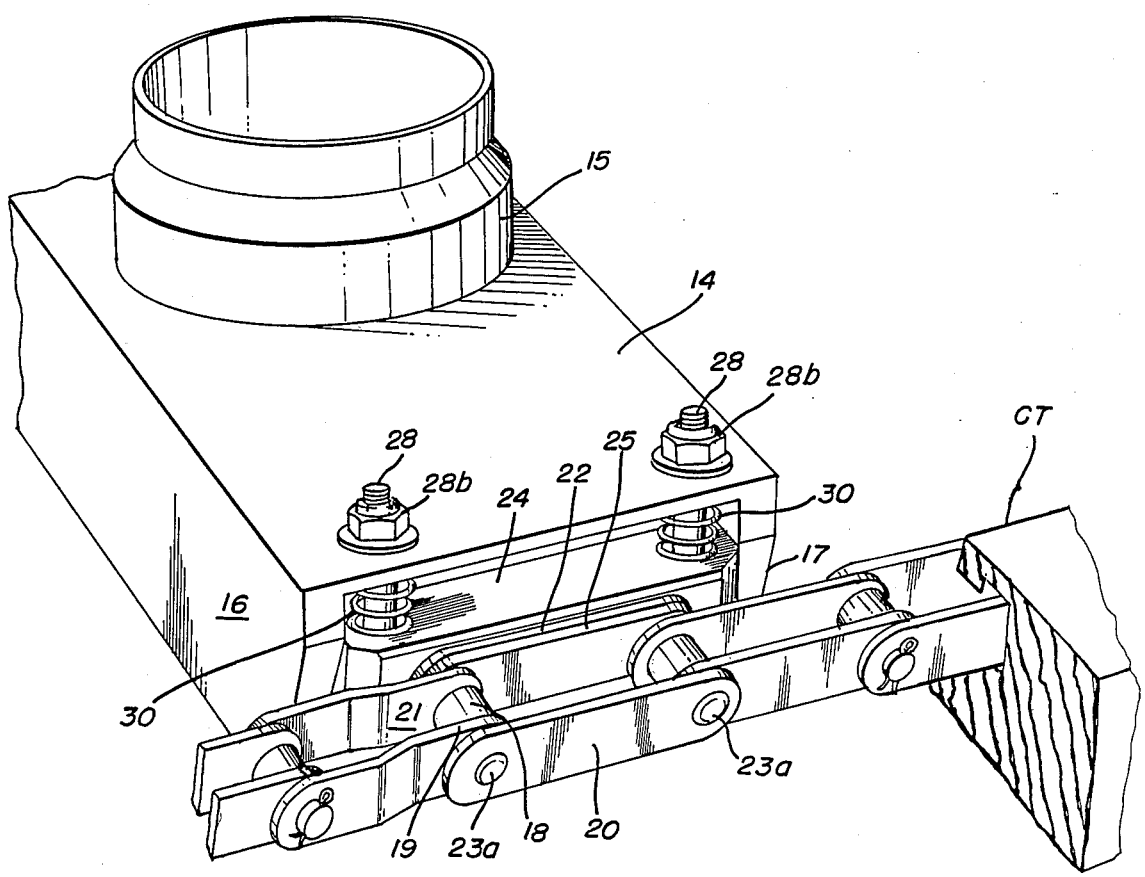
FIG. 4 is an enlarged perspective view of a portion of FIG. 1.

According to a feature of this invention, the support bar 14 is yieldably mounted on vertically yieldable conveyor means which includes a chain track CT which is fixedly mounted to frame F. Rollers such as 18 are interconnected by chain links 19 and 20 and by links 21 and 22. A pin 23 having a head 23a extends through the roller 18 and the links 19-22 and through support bar 24. Support bar 24 is interposed between a link plate 25 and oppositely disposed link plate 26. A retainer clip 27 holds the support structure in assembled relation as shown in FIG. 2. Support bar 24 is disposed between the inner surfaces of side flanges 16 and 17 and is supported at each end by structure such as is shown in FIG. 2. Support bar 24 is also arranged to support a pair of guide posts 28 as is shown schematically in FIGS. 1 and 4. A pair of compression springs are disposed about the guide posts 28 respectively and are indicated in FIG. 4 by the numeral 30. The guide post 28 includes a head 28a and a nut 28b.

As is shown in FIG. 1, the sealing heads such as 12 are mounted on support bar 14. While not shown in the drawings, structure such as is shown in FIGS. 2 and 4 is disposed at both ends of support bar 14.

As is best shown in FIG. 3, sealing head 12 includes a heater element H which is electrically operated in known manner. As is apparent from FIG. 3, downward movement of sealing head 12 brings the lower part 31 thereof into coincidence and in contact with the lid L1 and effectively seals the lid L1 to the flange at the top of the container C1.

As is disclosed and claimed in U.S. Pat. No. 4,674,935, the container lid L1 is fed into coincidence with the container C1 by intermittently movable lid support means which includes releasable gripper means generally designated schematically at 32 and which also includes jaw J1 pivotally mounted on pivot 33 and biased in a clockwise direction by compression spring 34. This lid support means includes flight bar FB which is mounted at its ends on intermittently movable chains not shown in the drawings.

It will be understood that the container support means including the channel 14 and the tubes such as 13 is intermittently movable and the lid is applied during a dwell period. Following a sealing operation, the gripper 32 having a projection 35 is moved toward the left as shown in FIG. 3 and the projection 35 engages cam 36 and thus swings jaw J1 in a counterclockwise direction about pivot 33 to release the tab T of the lid L1. Of course the conveyor means including the support bar 24 and its associated chain and guide posts 28 and 29 as well as the compression springs 30 constitute vertically yieldable intermittently movable conveyor means for the intermittently movable conveyor means including channel 14 and tubes such as 13. Of course these structures must move in synchronism in order to effect a proper meshing of the lid such as L1 and the container such as C1.

In accordance with a feature of this invention, the extreme downward limit of travel of yieldably mounted intermittently movable container support means 14 and tube 13 is limited by an abutment means 40 which is shown schematically in FIGS. 2 and 3 and which comprises a rigidly mounted horizontal structural element supported by frame F and having a smooth upper surface. Thus when the lower edge 13a of tube 13 engages abutment means 40, the downward travel of tube 13 and of the container C1 and lid L1 is arrested. Under these conditions the compression springs such as 30 are compressed to some degree having functioned as yieldable means for interrelating the intermittently movable container support means 13 and 14 and the intermittently movable conveyor means 18–30 and without doing voilence to the mechanism or to the containers being sealed.

We claim:

1. Apparatus for applying a container lid to a filled container, said apparatus comprising an intermittently movable container support means, intermittently movable lid support means arranged for synchronous movement with movement of said intermittently movable container support means for positioning a container lid atop an open and filled container positioned on said intermittently movable container support means during dwell periods of said container support means and of said lid support means, a reciprocable sealing head disposed above said container and said lid and arranged to engage and seal said lid to the top edge of said container, and vertically yieldable intermittently movable conveyor means comprising a conveyor chain including a working reach disposed below said intermittently movable container support means at least during a dwell period thereof on which compression spring means is mounted and engageable with said intermittently movable container support means and said compression spring means comprising a support bar fixedly mounted on said conveyor chain, and a pair of guide posts slidably disposed in apertures formed in said support bar and in said intermittently movable container support means, and a pair of compression springs disposed about said guide posts respectively and between said support bar and said movable container support means for supporting and moving said intermittently movable container support means.

2. Apparatus for applying a container lid to a filled container having outwardly and upwardly tapered sides, said apparatus comprising an intermittently movable container support means including a horizontal support bar having a plurality of circular apertures in which a plurality of container supporting tubes are disposed each having a cylindrical vertical inner surface and a smooth continuous upper edge, intermittently movable lid support means arranged for synchronous movement with movement of said intermittently movable container support means for positioning a container lid atop an open and filled container positioned on said intermittently movable container support means during dwell periods of said container support means and of said lid support means, a reciprocable sealing head disposed above said container and said lid and arranged to engage and seal said lid to the top edge of said container, and vertically yieldable intermittently movable conveyor means for supporting and moving said intermittently movable container support means.

* * * * *